(12) United States Patent
Phillips et al.

(10) Patent No.: US 8,520,352 B2
(45) Date of Patent: Aug. 27, 2013

(54) MULTIPLE-CHANNEL ACTIVE SENSING AND SWITCHING DEVICE

(75) Inventors: David L. Phillips, Santa Ana, CA (US); Gerard K. Caldwell, Corona, CA (US); William B. McDonough, Huntington Beach, CA (US); Martin Ruse, Glouchester, MA (US); Lester Snedaker, Morehead City, NC (US); Vijay Mallik, Chino Hills, CA (US)

(73) Assignee: Xylem IP Holdings LLC, White Plains, NY (US)

( * ) Notice: Subject to any disclaimer, the term of this patent is extended or adjusted under 35 U.S.C. 154(b) by 375 days.

(21) Appl. No.: 12/072,503

(22) Filed: Feb. 25, 2008

(65) Prior Publication Data

US 2009/0213515 A1    Aug. 27, 2009

(51) Int. Cl.
*H02H 3/08*    (2006.01)
*H02H 9/02*    (2006.01)

(52) U.S. Cl.
USPC ......... 361/93.2; 361/93.1; 361/93.9; 257/355

(58) Field of Classification Search
USPC ................. 361/93.2, 93.1, 93.9, 31
See application file for complete search history.

(56) References Cited

U.S. PATENT DOCUMENTS

| | | | |
|---|---|---|---|
| 4,937,757 A | 6/1990 | Dougherty | |
| 5,452,173 A | 9/1995 | Brannon et al. | |
| 5,594,404 A * | 1/1997 | Happ et al. | 337/210 |
| 5,615,105 A | 3/1997 | Tofigh et al. | 364/138 |
| 5,982,596 A | 11/1999 | Spencer et al. | |
| 6,195,243 B1 | 2/2001 | Spencer et al. | |
| 6,262,872 B1 | 7/2001 | Messerli et al. | |
| 6,496,342 B1 | 12/2002 | Horvath et al. | |
| 6,545,849 B1 | 4/2003 | Dougherty | |
| 6,768,969 B1 | 7/2004 | Nikitin et al. | 702/188 |
| 6,816,758 B2 * | 11/2004 | Maxwell et al. | 700/292 |
| 6,998,807 B2 * | 2/2006 | Phillips et al. | 318/455 |
| 7,016,174 B2 | 3/2006 | Dougherty | |
| 7,177,125 B2 * | 2/2007 | Lazarovich et al. | 361/42 |
| 7,619,865 B2 * | 11/2009 | Thiery et al. | 361/93.1 |
| 2001/0033470 A1 | 10/2001 | Messerli et al. | |
| 2003/0072113 A1 | 4/2003 | Wong et al. | |
| 2003/0086228 A1 | 5/2003 | Papallo, Jr. et al. | |
| 2003/0107860 A1 | 6/2003 | Dougherty | |
| 2004/0136133 A1 | 7/2004 | Youm | |
| 2004/0213676 A1 | 10/2004 | Phillips et al. | 417/44.11 |
| 2005/0018372 A1 | 1/2005 | Hui | |

(Continued)

OTHER PUBLICATIONS

International Search Report issued on Apr. 7, 2009 in corresponding international application No. PCT/US09/33004 (filed on Feb. 4, 2009) (4 pages).

*Primary Examiner* — Rexford Barnie
*Assistant Examiner* — Zeev V Kitov

(57) ABSTRACT

The present invention provides a multichannel active sensing and switching device featuring a multiple sensing and switching module configured to respond to operational conditions of different load types and provide load type sensor signals containing information about the operational conditions of the different load types, and also configured to respond to controller signals for controlling the operation of the different load types in two or more different protection configurations; and a controller module configured to respond to the load type sensor signals and provide the controller signals in order to control the operation of the different load types in the two or more different protection configurations. The controller module may be programmable and configured to provide a default circuit breaker configuration and a device specific configuration using active intelligence (AI).

53 Claims, 13 Drawing Sheets

Multi-channel ASSD block diagram

(56) References Cited

U.S. PATENT DOCUMENTS

| | | |
|---|---|---|
| 2005/0099746 A1 | 5/2005 | Vergnat et al. .............. 361/62 |
| 2006/0044721 A1 | 3/2006 | Henderson |
| 2006/0072262 A1 | 4/2006 | Paik et al. |
| 2007/0086135 A1 | 4/2007 | Swartzendruber et al. |

* cited by examiner

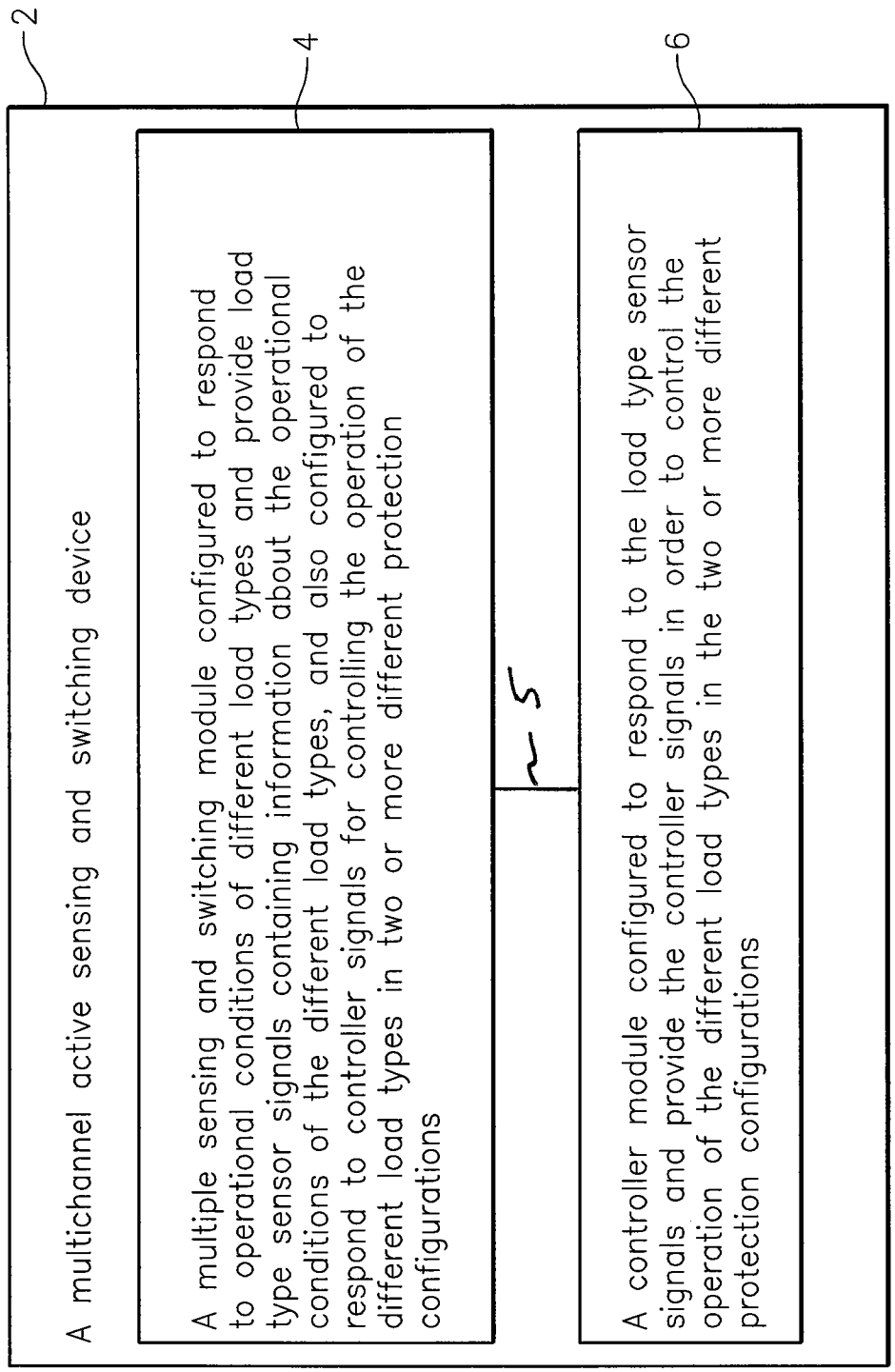
FIG. 1a : Basic block diagram of Multichannel ASSD

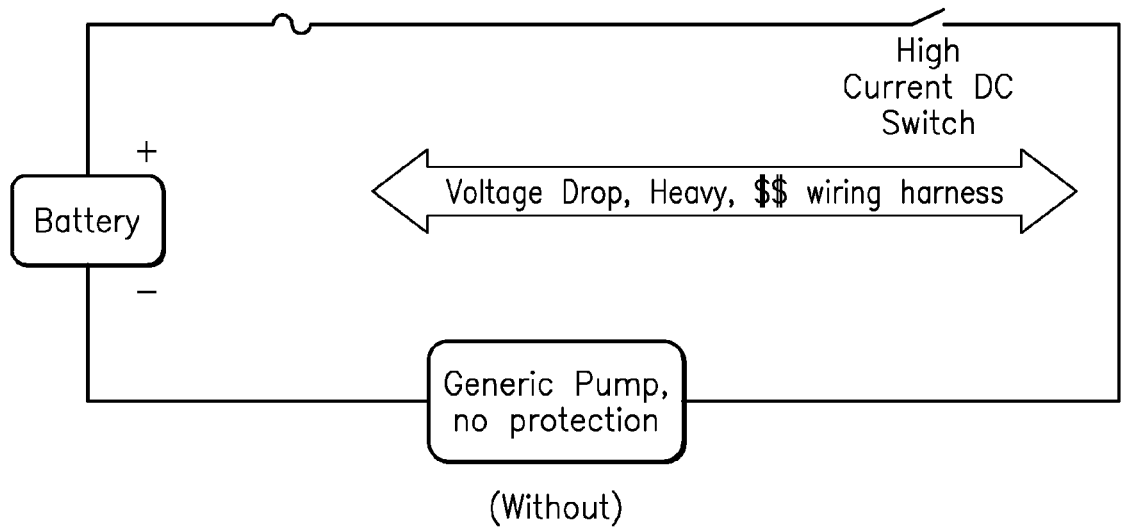
FIG. 1b: Basic System Configuration
(PRIOR ART) without multichannel ASSD
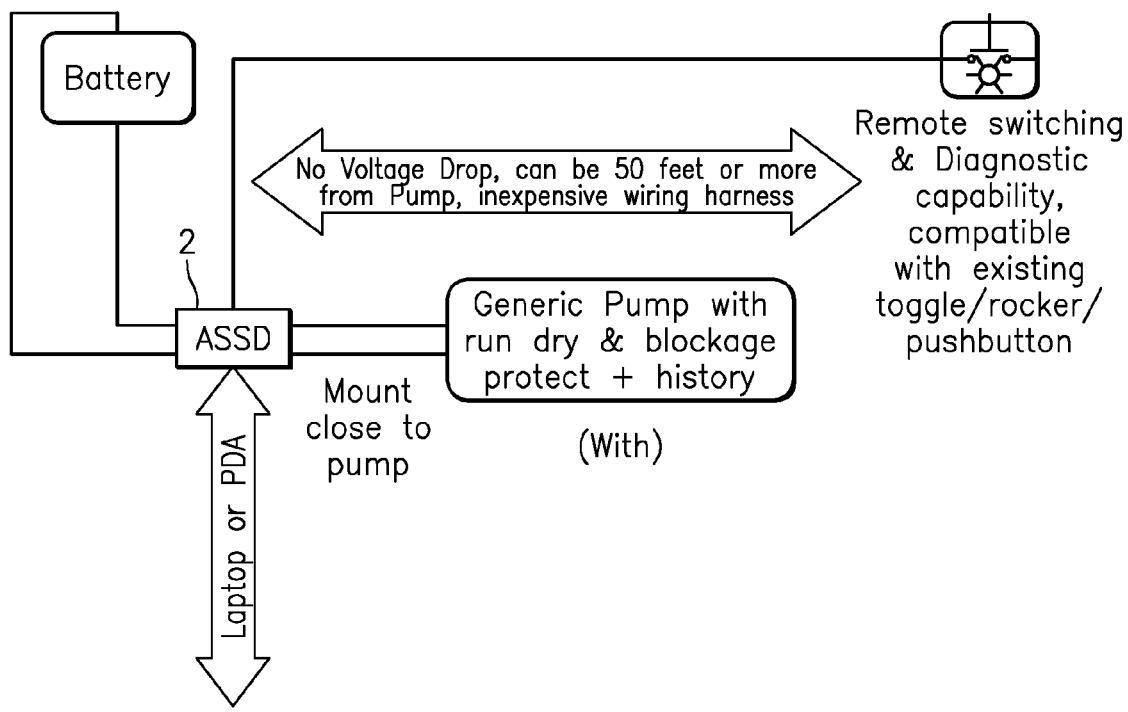
FIG. 1c: Basic System Configuration with multichannel ASSD

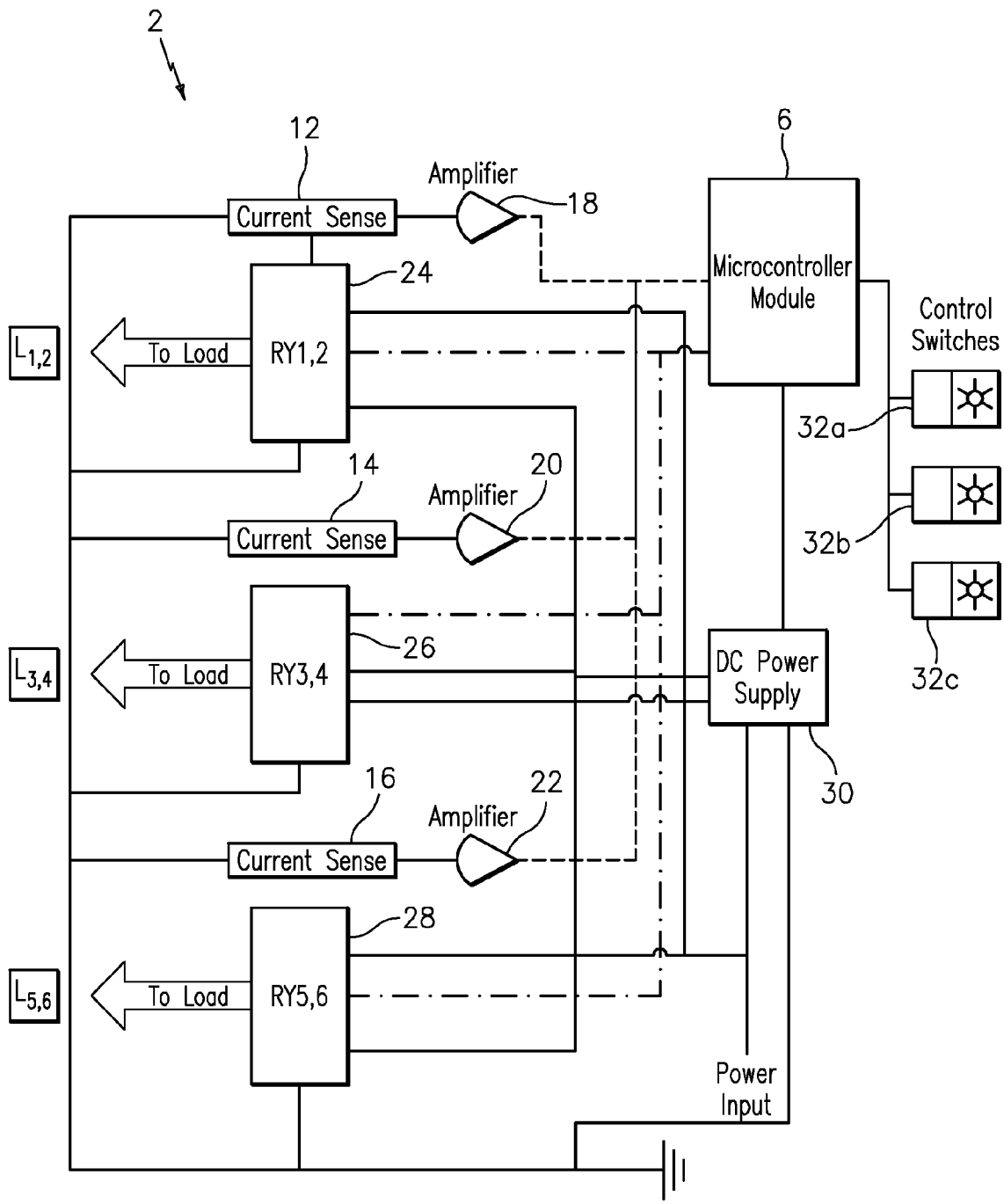
*FIG. 2*: Multi-channel ASSD block diagram

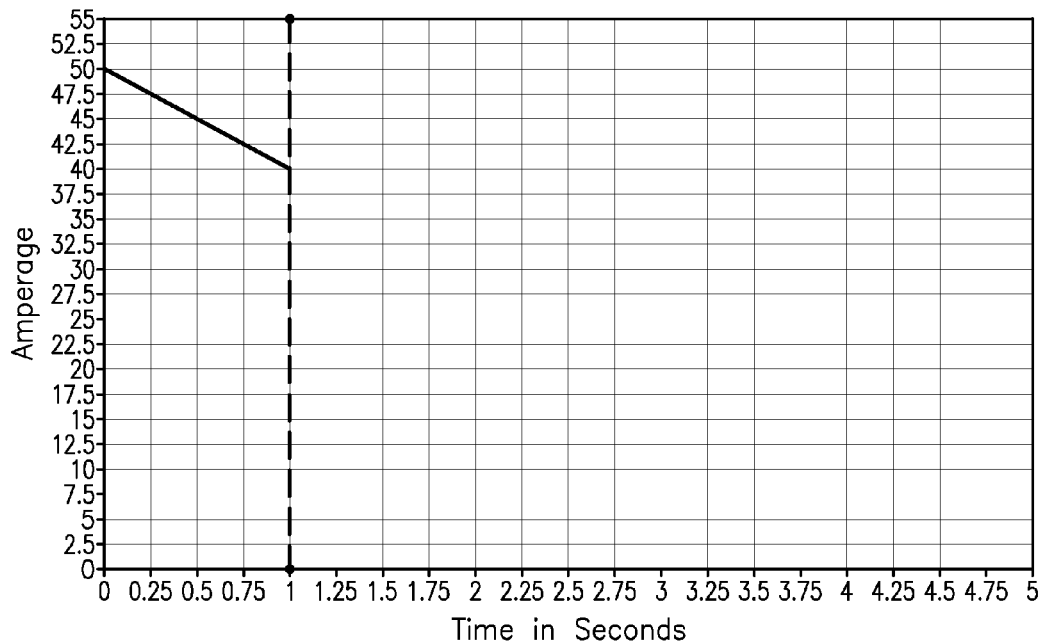
FIG. 3a : Graph of High in rush current
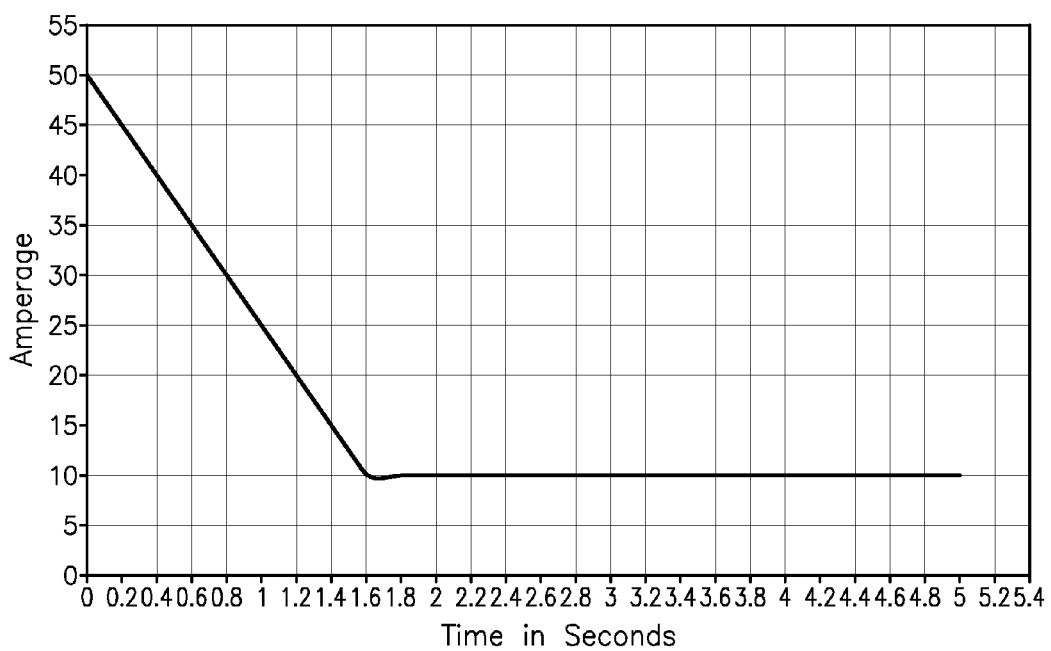
FIG. 3b : Graph of Normal in rush current

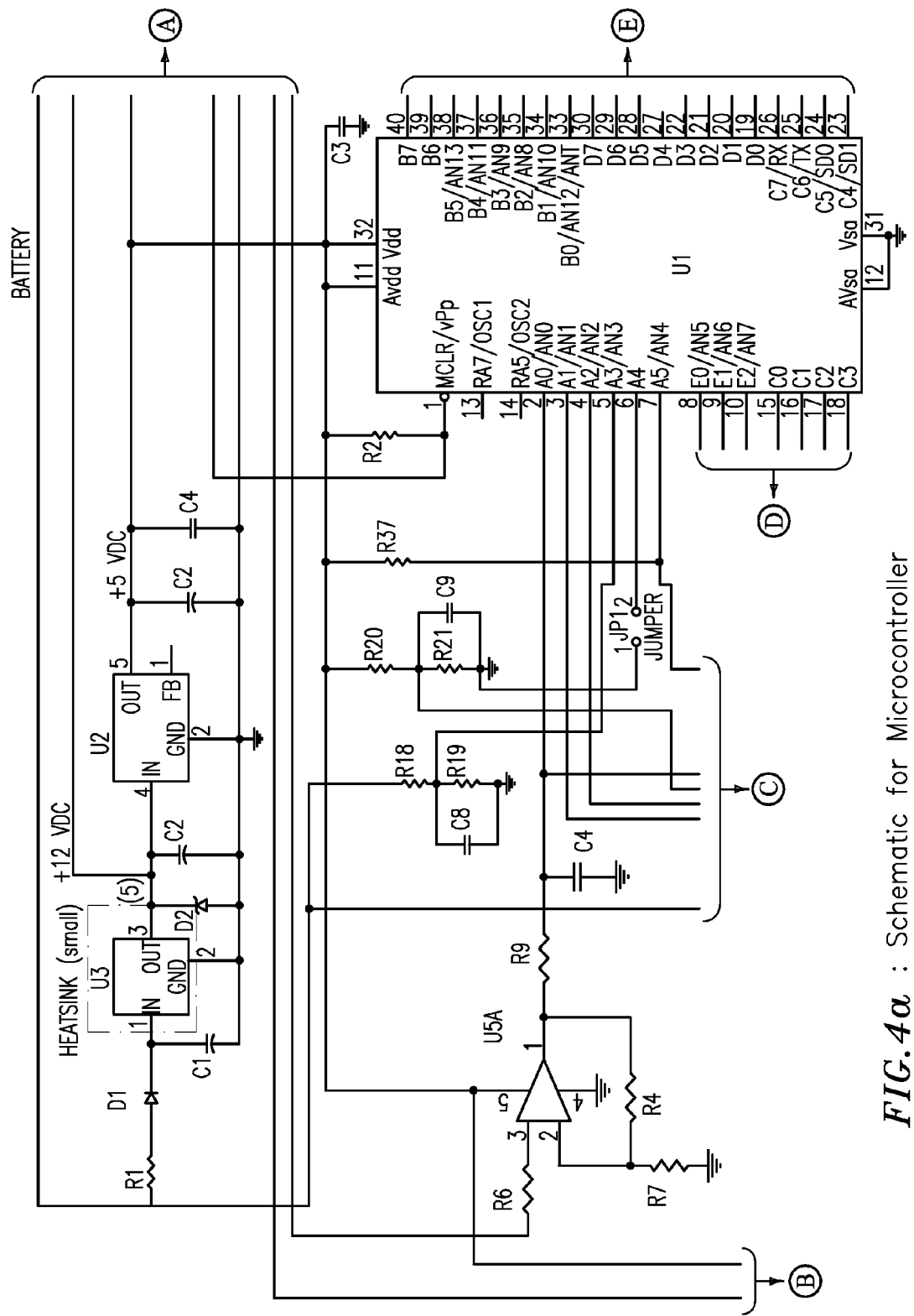
FIG. 4a: Schematic for Microcontroller

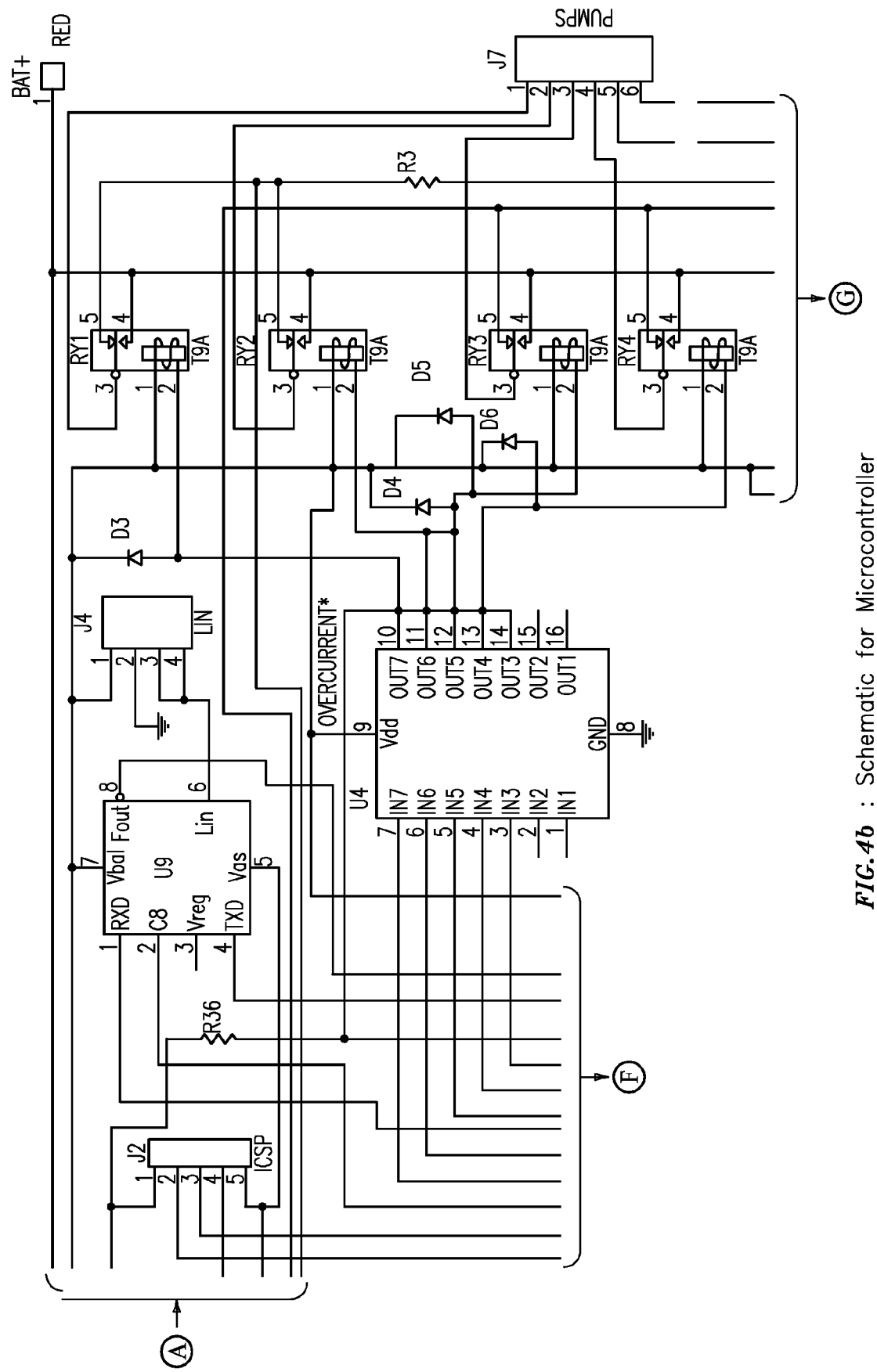
FIG. 4b : Schematic for Microcontroller

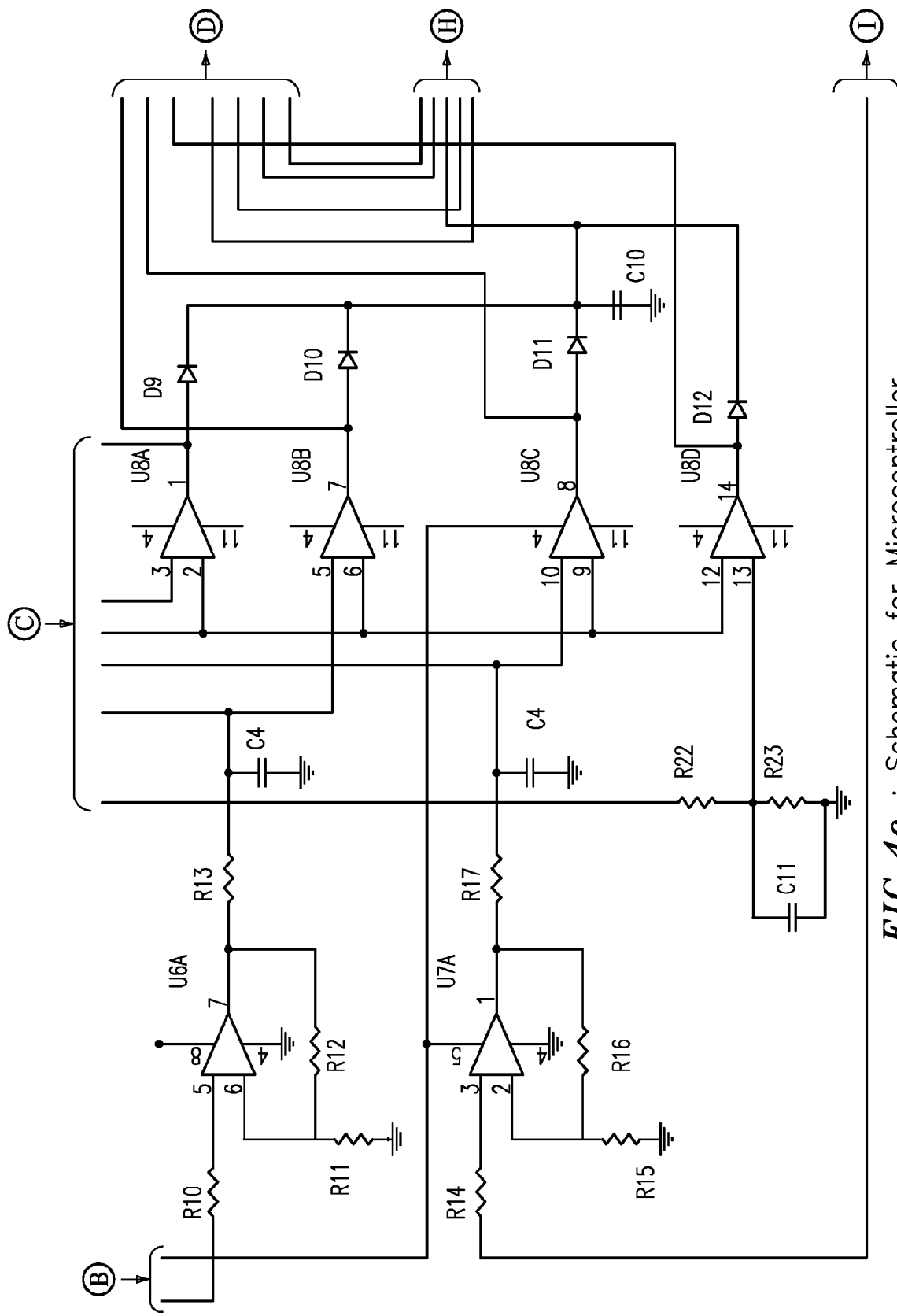
FIG.4c : Schematic for Microcontroller

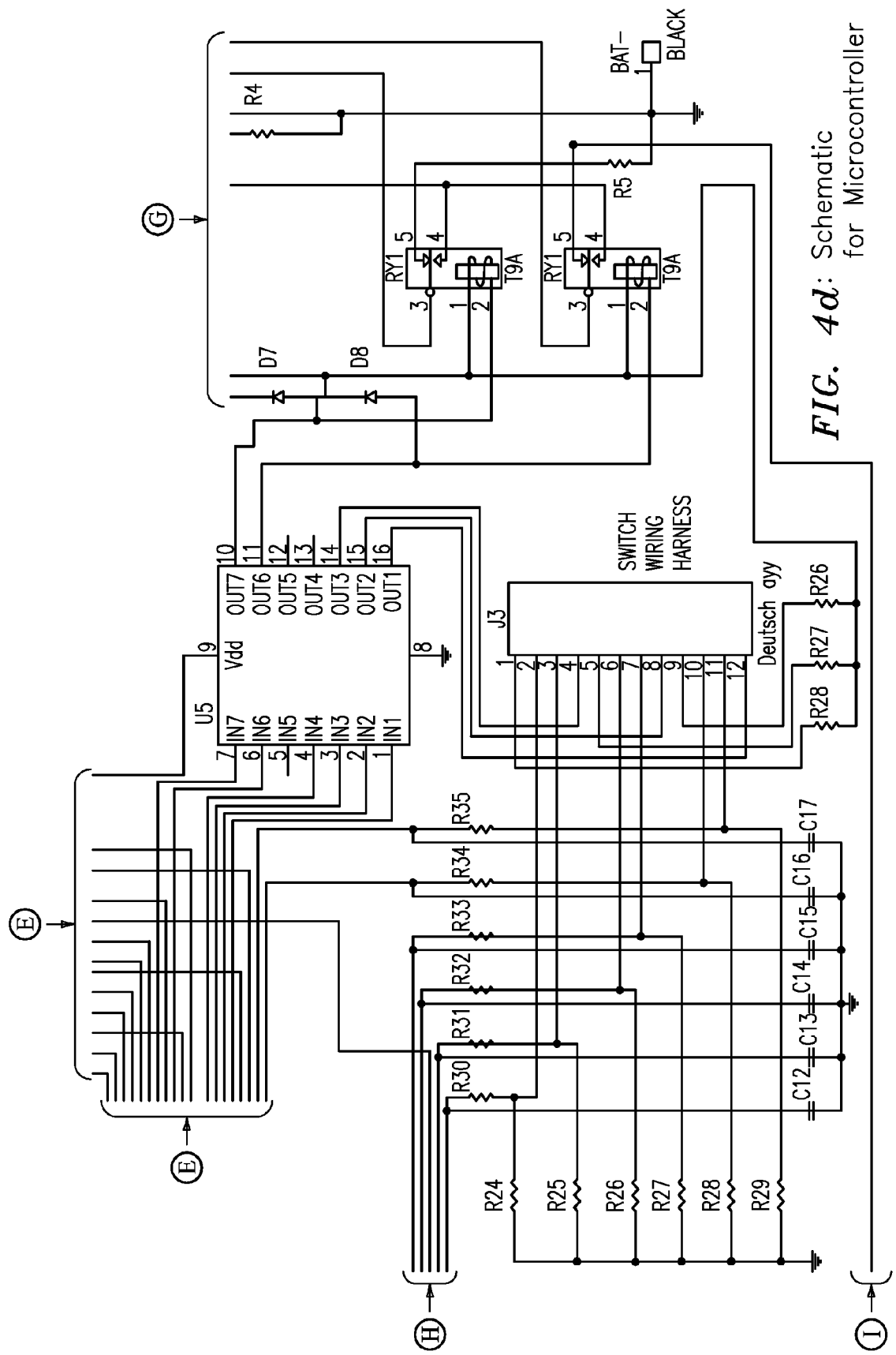
FIG. 4d: Schematic for Microcontroller

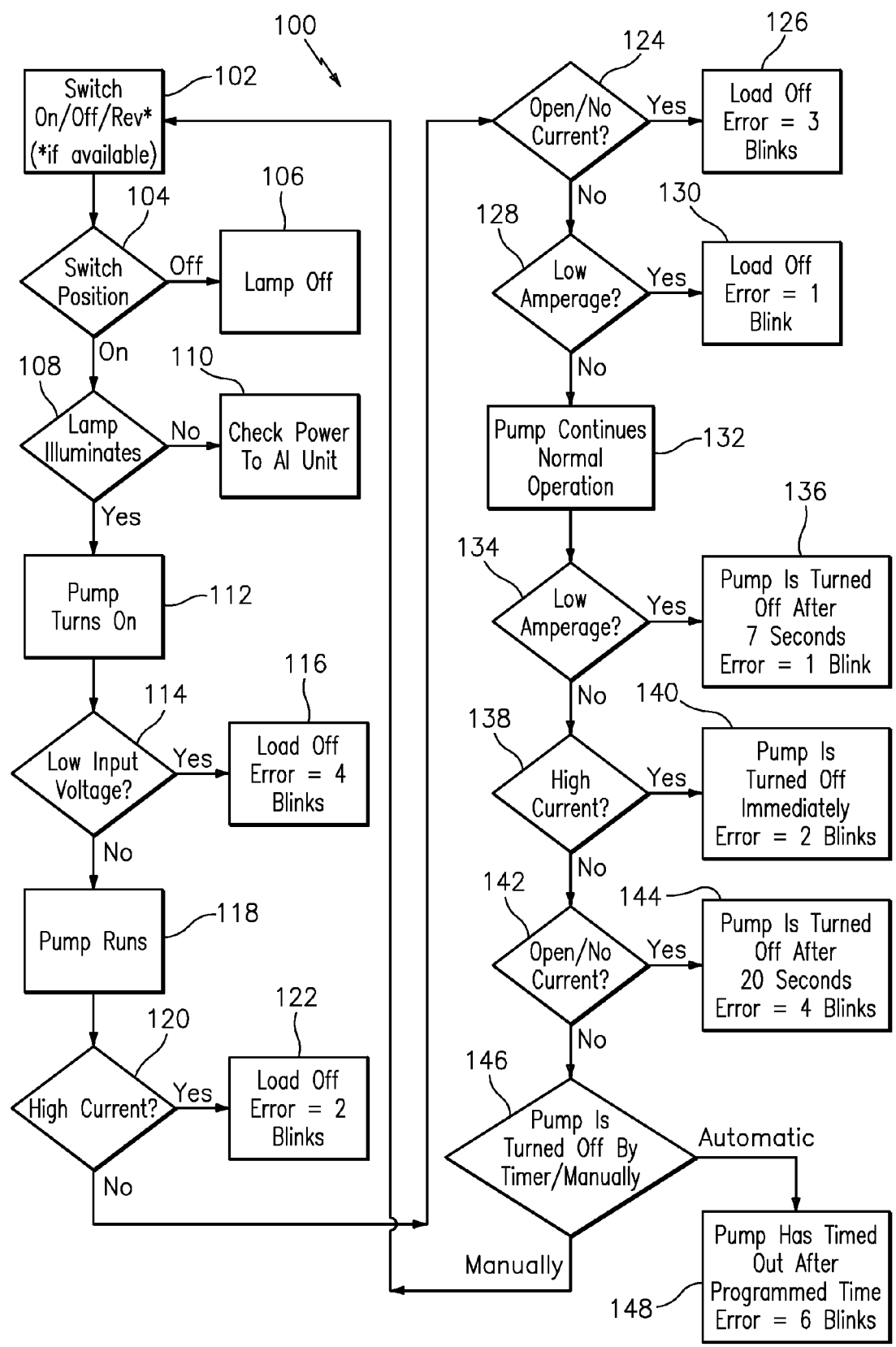
FIG. 5: Normal Operation

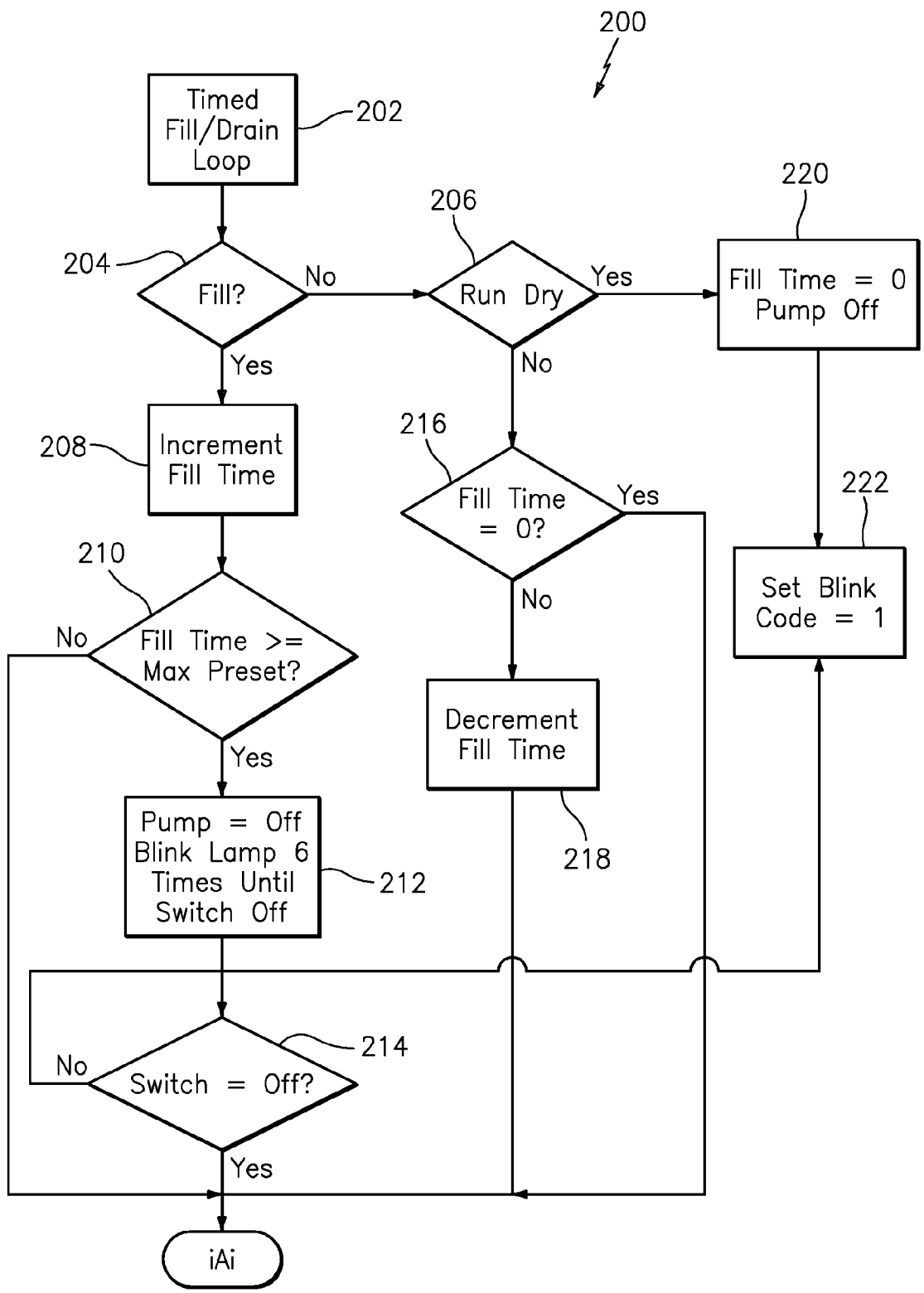
FIG. 6: Time Set Up

Circuit breaker device 300

Sensing and switching module 302 configured to respond to an undesirable operational condition of a load type and provide a load type sensor signal containing information about the undesirable operational condition of the load type, and also configured to respond to a controller signal for shutting off the operation of the load type

~ 303

Controller module 304 configured to respond to the load type sensor signal and provide the controller signal in order to shut off the operation of the load type

*FIG. 7*: The Circuit Breaker Device 300

MULTIPLE-CHANNEL ACTIVE SENSING AND SWITCHING DEVICE

BACKGROUND OF THE INVENTION

1. Field of the Invention

The present invention relates to a method and apparatus for providing a multi-channel sensing and switching device.

2. Brief Description of Related Art

There are many known method and apparatus for providing multi-channel sensing and switching.

For example, U.S. Pat. No. 6,998,807, owned by the assignee of the instant patent application, discloses an active sensing and switching device having a controller that senses a signal indicating a sensed value of electrical current to a load, determines a nominal value for the electrical current to the load based on monitoring over a period of time, and disconnects the load from a power source based on the signal. The disconnection can be made after a waiting period. The controller can also receive signals indicating sensed values of electrical current to a plurality of respective loads. However, among other things, the '807 patent does not disclose controlling different load types using different load type control signals, or using a time/current magnitude weighted algorithm, or using a combination of sensed current and voltage, or using a centralized controller for centralized real-time control. However, the technique disclosed in the '807 can handle only one channel at a time and has no branch circuit protection, and it is also not field programmable.

Other known techniques include the following:

Patent Application Publication No. 2007/0086135 discloses a fault circuit indicator having an adjustable trip circuit for producing a trip output using a technique based on an adjustable trip level that depends on the passage of time and at least one fault indication curve.

U.S. Pat. No. 4,937,757 discloses circuit interrupters having selectable trip parameters using a technique based on a logarithmic interpolation algorithm for interpolating between fixed data points stored in memory means corresponding to thermal and magnetic interruption devices to generate a continuous representation of a calculated time delay. An EEPROM provides data. The timing is based on current levels and the trip curves are taught for different levels of current.

Patent and publication nos. U.S. Pat. Nos. 6,545,849, 7,016,174 and 2003/0107860 are similar to the above '757 patent where current and threshold valves are detected to control tripping. A multi-algorithmic approach is employed. In particular, the '849 patent discloses an instantaneous fault technique based on a comparison of an absolute value of a present current value and a first current threshold, and of a multiple peak sum and a second current threshold. The '174 patent and '860 publication contain similar features.

Moreover, other know techniques include a circuit breaker system using a technique based on historical memory information associated with individual breakers; a circuit breaker system using a technique based on a comparison of power line data and historical power line data; an electronic trip unit based on a repetitive sampling, comparison and incrementing technique; a distributed monitoring and protection system using a technique based on a comparison of measured electrical parameters, e.g., from different current nodes at different potentials, or from different branches, measured by two monitoring units; an electronic trip unit using a technique based on a comparison of a rate of rise of electrical characteristics to detect a spike and a withholding of a trip signal when the rate is greater than a limit value selected by a switch; a panel board configured for distributing electricity from a power source using a technique based on controlling main circuit breakers and branch circuit breakers; a power supply device having an AC power supply, rectifier and capacitor combination using a technique, e.g., based on controlling a connection depending if a voltage applied across the capacitor exceeds a predetermined PFC voltage limit; a control system for a power supply protector controllable through an IP address; a power control using a technique based on zero crossing logic; a system for controlling power to a plurality of loads, one being a primary power source, and at least one being a back-up power source, using a technique based on categorizing delayable and non-delayable loads and allocating power based on the categorization.

Moreover, in the prior art circuit breaker protection for certain load types, such as pumps on boats as well as other particular applications, is known to include the use of MOSFET devices in combination with in-line fuses to protect the load types from being damaged by, e.g., high current. In operation, such MOSFET devices that are able to handle such high currents, e.g. 30 Amps, are typically expensive devices, costing in the range of as much as, e.g., $3-5 per device (at the time of filing the present invention). In practice, when such MOSFET devices burn out, the MOSFET and in-line fuse typically have to be repaired, which usually results in a service cost and/or charge to the owner of the boat or other suitable application that can e expensive. In view of this, there is a need in the art for improved circuit breaker protection for these types of applications.

SUMMARY OF THE INVENTION

The present invention provides a new and unique multi-channel active sensing and switching device featuring a multiple sensing and switching module configured to respond to operational conditions of different load types and provide load type sensor signals containing information about the operational conditions of the different load types, and also configured to respond to controller signals for controlling the operation of the different load types in two or more different protection configurations; and a controller module configured to respond to the load type sensor signals and provide the controller signals in order to control the operation of the different load types in the two or more different protection configurations.

The controller module may be programmable and configured to provide a default circuit breaker configuration and a device specific configuration using active intelligence (AI).

The controller module may be configured to sense an overcurrent condition, such as a dead short, in at least one different load type and provide a circuit breaker configuration control signal to shut off the at least one different load type.

The controller module may be configured to determine a particular operational condition of at least one different load type and provide a load protection diagnostics signal to shut off the at least one different load type depending on the particular operational condition.

The controller module may be configured to determine a particular operational condition of a pump, including pump-specific operational conditions like run-dry, a blockage or low battery voltage, and provide a load protection diagnostics signal so as to implement run-dry protection, blockage, lo-battery voltage protection.

The controller module is configured to provide real-time control of one or more different load types and to be field programmable.

The controller module may be configured to use different algorithms to control the operation of the different load types.

The controller module may include a memory module configured to store the different algorithms. The memory module may includes a non-volatile (EEPROM) memory having the different algorithms stored as configuration data when the multichannel active sensing and switching device is programmed.

The controller module is configured to provide a default control configuration for controlling the operation of at least one different load type, where the default control configuration may include a circuit breaker operation in which only an over-current condition will cause the multichannel active sensing and switching device to shut off the at least one different load type and blink a diagnostic indication.

The controller module may be configured to respond to an input signal and enable an active intelligence mode so as to implement load-specific diagnostics.

The controller module may be configured to integrate current as a function of time and determine how much energy or power is being used instantaneously by at least one different load type so as to provide inrush current protection. The controller module may be configured to implement a time/current magnitude weighted algorithm having a time loop subroutine in which the current and/or voltage is sampled at predetermined time intervals for a predetermined completion period. The time loop subroutine may include steps for sensing current of the at least one different load type, weighting a countdown variable based on the sensed current so as to determined a weighted countdown variable, and counting up or down to or from the predetermined completion period based on the weighted countdown variable. The controller module may be configured to shut off the at least one different load type depending on the number of times the time loop subroutine is executed.

The controller module may be configured to respond to a signal containing information about a negative operational condition in at least one different load type and provide a warning signal for controlling the provisioning of an audio warning, a visual warning or a combination thereof to indicate the negative operational condition of at least one different load type.

The controller module may be configured to respond to a predetermined excessive voltage drop or current increase in at least one different load type and to shut off at least one different load type when either condition is sensed.

The controller module may be configured to acquire an average current drain over long periods of time and use the average current drain as baseline to learn the average current target so as to modify an original factory setting for more specific control.

The controller module may be configured to adjust this learned value to variations in applied voltage to track changes in the current that are due to system variations in voltage so as to allow the current target to track the optimum target as the voltage changes with time or environmental reasons.

The controller module may also be configured to be networkable to one or more wired or wireless networks, including Local Interconnect Network (LIN), a controller area network (CAN), USB, Ethernet, ZigBee, Wi-Fi or other proprietary wired and wireless protocols either now known or later developed in the future. The scope of the invention is not intended to be limited to the type or kind of network to which the controller module is configured to interface. The method of interaction between the user and the multiple ASSD unit or device may include user interfaces such as touch screen, Personal Digital Assistants (PDA), cell phones, as well as switch driven.

The multiple sensing and switching module may include sensors configured to respond to the operational condition of the different load types and provide the load type sensor signals containing information about the operational conditions of the different load types, and the sensors may be current sensors. The multiple sensing and switching module may also include relays configured to respond to the controller signal for controlling the operation of the different load types. The multiple sensing and switching module may be configured to respond to power signals from a power supply and provide the power signals to at least one different load type. The power signals are DC signals from a DC power supply.

The multichannel active sensing and switching device may also include multiple control switches configured to respond to input signals and provide control switch signals to the controller module for controlling the operation of the multiple sensing and switching module.

The present invention may also take the form of a method featuring sensing operational conditions of different load types and providing load type sensor signals containing information about the operational conditions of the different load types; responding to the load type sensor signals and providing programmable controller signals in order to control the operation of the different load type in two or more different protection configurations; and controlling the operation of the different load types in response to the programmable controller signals in the two or more protection configurations.

The present invention may also take the form of a new and unique circuit breaker device featuring a sensing and switching module in combination with a controller module. In operation, the sensing and switching module is configured to respond to an undesirable operational condition of a load type and provide a load type sensor signal containing information about the undesirable operational condition of the load type, and also configured to respond to a controller signal for shutting off the operation of the load type; and the controller module is configured to respond to the load type sensor signal and provide the controller signal in order to shut off the operation of the load type.

In some embodiments according to the present invention, the sensing and switching module may take the form of a relay device; the load type may take the form of a pump; the undesirable condition may be a high current condition; and/or the controller module may be programmable to sense one or more different undesirable circuit breaker conditions. The present invention may also take the form of a new and unique method for providing circuit breaker protection, featuring sensing an undesirable operational condition of a load type and providing a load type sensor signal containing information about the undesirable operational conditions of the load type; responding to the load type sensor signal and providing a controller signal in order to shut off the operation of the load type; and shutting off the operation of the load type in response to the controller signal.

In operation, the multichannel active sensing and switching device according to the present invention provides the following:

1) An active power management system (APM) with local sensing and control and interface for low current remote control and real-time diagnostic reporting.

2) Pump control that allows the user to manually turn the pump on/off or reverse direction (if applicable).

3) Pump Protection that monitors for over current (including blockage and short circuits), run dry, opens, low voltage etc. The pump is monitored using a current sensor with proprietary software, actively tracking the pump's function.

When there is signification deviation from the unique predefined operating parameters, the unit reacts by shutting the pump off and reporting the issue via an illuminated switch normally used for user control. No extra wiring or special switches are required 4) Interactive: The unit interfaces with the end user and reports function (normal operation, run dry, over current etc) via the switch's illumination.

5) Reduces wiring that allows installer to run less wire, as the load is monitored and switched at the pump so that small gauge wire is run to the switch. Wiring is reduced by not having to run large primary current-carrying wires to the switch and back. The reduced wire and wire gage provides for cost and weight savings.

6) Unit records what happens to the pumps for future downloading and monitoring of true life function by recording function and malfunction of the pump.

7) Networkability of the device via wired or wireless networks, e.g., LIN, ZigBee or Wi-Fi, for allowing an operator to interface with the multichannel ASSD.

8) Controlling current to a load

9) Monitoring the current of a unit and using the current to detect malfunctions of the unit.

10) Shutting off the unit based on the current monitoring.

BRIEF DESCRIPTION OF THE DRAWING

The drawing includes the following Figures, not drawn to scale:

FIG. 1a is a block diagram of a multi-channel ASSD according to some embodiments of the present invention.

FIG. 1b is a diagram of a basic system configuration known in the art without the multi-channel ASSD shown in FIG. 1a.

FIG. 1c is a diagram of a basic system configuration with the multi-channel ASSD shown in FIG. 1a.

FIG. 2 is a more detailed block diagram of the multi-channel ASSD shown in FIG. 1a.

FIG. 3a is a graph of amperage versus time showing high in rush current.

FIG. 3b is a graph of amperage versus time showing normal in rush current.

FIG. 4 shows a schematic of the microcontroller shown in FIG. 1.

FIG. 5 shows a diagram of a flow chart having steps for normal operation according to some embodiments of the present invention.

FIG. 6 shows a diagram of a flow chart having steps for fill drain time set up according to some embodiments of the present invention.

FIG. 7 shows a block diagram of a circuit breaker device according to some embodiments of the present invention.

DETAILED DESCRIPTION OF THE INVENTION

Figure 3C:
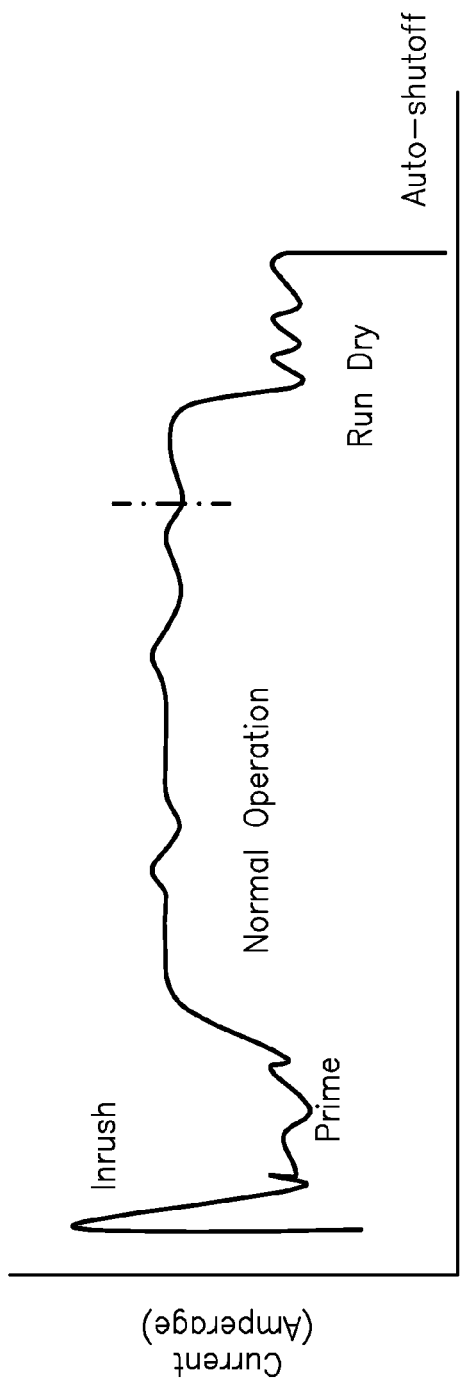
FIG. 3c is a graph of amperage versus time showing a run dry operational condition.

FIG. 1a shows the basic invention in its broadest sense as a multichannel active sensing and switching device (ASSD) generally indicated as 2 (also referred to herein as an active intelligent or AI device) featuring a multiple sensing and switching module 4 and a controller module 6. The multiple sensing and switching module 4 is configured to respond to operational conditions of different load types $L_{1,2}, L_{3,4}, L_{5,6}$ and provide load type sensor signals along signal path 5 containing information about the operational conditions of the different load types $L_{1,2}, L_{3,4}, L_{5,6}$, and is also configured to respond to controller signals along signal path 5 for controlling the operation of the different load types $L_{1,2}, L_{3,4}, L_{5,6}$ in two or more different protection configurations. The controller module 6 is configured to respond to the load type sensor signals and provide the controller signals in order to control the operation of the different load types $L_{1,2}, L_{3,4}, L_{5,6}$ in the two or more different protection configurations. By way of example, below the present invention is shown and described in relation to load types such as a pump and a light using current sensing. However, the scope of the invention is not intended to be limited to the type or kind of load types $L_{1,2}, L_{3,4}, L_{5,6}$ being sensed and switched according to the present invention; and embodiments of the invention are intended to include load types $L_{1,2}, L_{3,4}, L_{5,6}$ both now known and later developed in the future. The scope of the invention is also not intended to be limited to the type or kind of input being sensed. For example, embodiments are envisioned in which the input being sensed may be temperature, or pressure, or inputs from a programmable logic controller (PLC), as well as other type or kinds of inputs either now known and later developed in the future.

FIGS. 1b and 1c show diagrams of a basic system configuration with and without the multi-channel ASSD shown in FIG. 1a. In FIG. 1b, the basic system configuration includes a generic load in the form of a pump connected in series with a standard high current switch and a battery. In FIG. 1c, the basic system configuration includes the multichannel ASSD 2 shown in FIG. 1a coupled between a battery and a generic load in the form of a pump and a remote switch. The ASSD 2 provides run dry and blockage protections and also maintains historical data about the pump, and provides diagnostic capability for the switch. As shown in FIG. 1c, the ASSD unit or device may be coupled to a laptop or Personal Digital Assistant (PDA), as well as other such device having suitable user interfaces like a touch screen or a cell phone. In this case, the controller module or other suitable module of the ASSD would be configured to provide the appropriate interface. The scope of the invention is also intended to include the ASSD being configured to be networkable to one or more wired or wireless networks, including Local Interconnect Network (LIN), a controller area network (CAN), USB, Ethernet, ZigBee, Wi-Fi or other proprietary wired and wireless protocols either now known or later developed in the future. The scope of the invention is not intended to be limited to the type or kind of network to which the ASSD is configured to interface.

FIG. 2 shows the multi-channel ASSD 2 in FIG. 1a in more detail. As shown, the multiple sensing and switching module 4 includes three different load type sensors 12, 14, 16, three amplifiers 18, 20, 22 and three relays 24, 26, 28. Load type sensors like 12, 14, 16, amplifiers like 18, 20, 22 and relays like 24, 26, 28 are all known in the art, and the scope of the invention is not intended to be limited to any particular type or kind thereof. Moreover, the scope of the invention is intended to include load type sensors, amplifiers and relays either now known or later developed in the future. The multi-channel ASSD 2 may also include a suitable power supply, such as a DC power supply 30, although the scope of the invention is also intended to include an AC power supply, as well as other types or kinds of power supplies either now known or later developed in the future. The multi-channel ASSD 2 may also include control switches 32a, 32b, 32c for manually controlling the operation of the ASSD device and the corresponding load types.

Figure 3D:
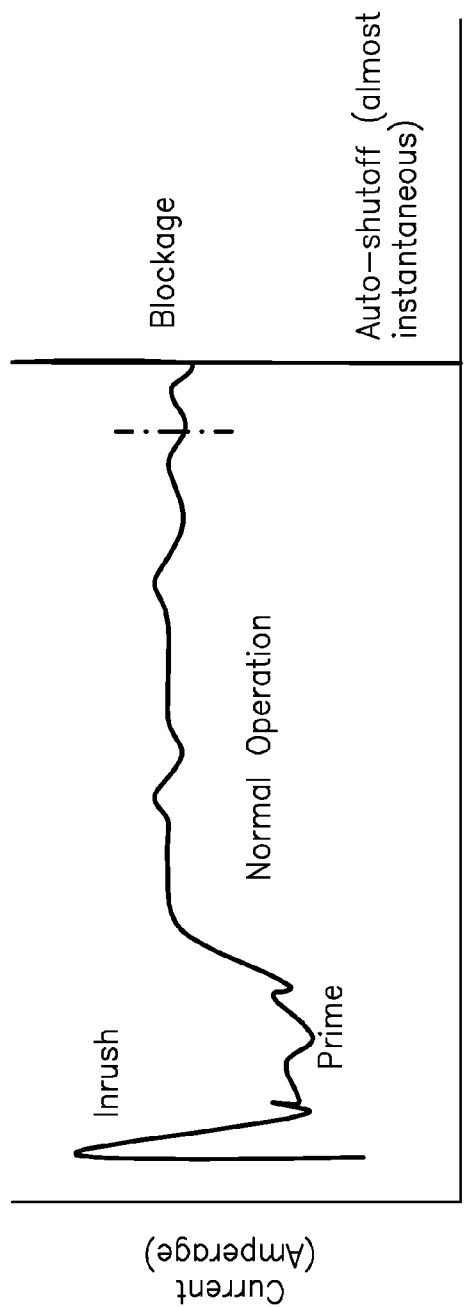
FIG. 3d is a graph of amperage versus time showing a blockage operational condition.

By way of example, in operation the multi-channel ASSD 2 has the ability to configure the control for the different load types $L_{1,2}$, $L_{3,4}$, $L_{5,6}$—either using simple "Circuit Breaker" configurations or more sophisticated load protection schemes for pumps and other unique loads. This control information is initially stored in suitable memory that forms part of the microcontroller module 6, e.g. non-volatile (EEPROM) memory, as configuration data when the product is programmed. The default configuration may include a circuit breaker operation, in which only an over-current condition will cause the AI device 2 to shut off one or more of the different load types $L_{1,2}$, $L_{3,4}$, $L_{5,6}$ and provide a warning, including, e.g. blinking a diagnostic indication. Low or no current operation does not cause a problem. If the AI mode is enabled in the microcontroller module 6, then the load-specific diagnostics are implements, such as e.g. pump-specific like, e.g. run-dry protection (see FIG. 3c), blockage protection (see FIG. 3d), lo-battery voltage protection, for one or more of the different load types $L_{1,2}$, $L_{3,4}$, $L_{5,6}$. The scope of the invention is not intended to be limited to the type or kind of protection being implemented, and may include types and kinds of protection now know, e.g. run-dry protection, blockage protection, or lo-battery voltage protection, as well as other types or kind of protection later developed in the future.

In effect, the multi-channel ASSD 2 has the ability to handle multiple different types of loads from one control device or box in real-time. In other words, by way of example, if three load types are handled, then one may have channels 1 and 2 configured for AI control with two pump loads and a channel 3 configured as a circuit breaker for one resistive load. Simultaneously, channel 1 may have a run-dry condition (see FIG. 3c) on a pump, channel 2 may have a pump blockage condition (see FIG. 3d) on another pump, and channel 3 may have a dead short on, e.g., a bathroom fan. These events typically should not be handled sequentially on a "time available" basis; instead, they should be handled immediately and concurrently. The system hardware and software of the present invention is optimized for accomplishing these real time tasks.

FIGS. 3a and 3b shows graphs of amperage versus rush current for high inrush current and normal inrush current. In the microcontroller module 6, an algorithm may be run by a microprocessor and used for such inrush current protection. The algorithm may take the form of a time/current magnitude weighted algorithm to effectively integrate the current as a function of time to see how much energy or power is being used instantaneously by a particular load type. The problem this resolves is that some loads, such as inductive pumps or cold lamp filaments, have extremely high inrush currents, sometimes 10 times their normal steady state current drain. This inrush current may last for perhaps as long as 1 to 2 seconds, although the heaviest current drain is likely to be in the first 100 milliseconds or so. Hence, merely setting a threshold in the software as a "not to exceed" value is likely to lead to "nuisance tripping" or unnecessary shutoffs because a normally functioning device has a big inrush current. Conversely though, a very low ohmic resistance such as shorted output wires from the control box to the load has such high currents that the unit is likely to be damaged if the load is not shut off in a very small period of time, in the vicinity of 10 to 20 milliseconds. The present invention enables one to protect a circuit from a truly destructive current in a few milliseconds while still allowing a 1 plus second inrush current of above "normal" current.

In one embodiment according to the present invention, a time loop may be used in which the current and voltage is sampled every few milliseconds. A down counter may be used that with normal current counts down by 1 for 2000 milliseconds. If the current is, e.g., 100 amps, then it gets a very high "weight" (say 100) such that it causes the inrush loop to complete in about 10-20 milliseconds. If the current is, e.g., 50 amps, then it gets a "weight" of, e.g., 50 so that the loop is complete in about 50-100 milliseconds. But if the current is, e.g., 30 amps, then it gets a weight of "1" so that the loop is lost for a full 2 seconds. So at the conclusion of the count, the software examines the number of times the loops has been executed. If it is large number of times (500-2000) it is likely a "normal" inrush current. In comparison, if the number of times the loops has been executed is less than 10 times, then this was likely a dead short scenario, which must cause the load to be switched off by the microcontroller module 6.

Likewise, if a really heavy load causes a large drop in voltage at the load, this may be bad for the load and even the control box if the current is not very large. The voltage is monitored as well and if an excessive drop is noticed, the load is also terminated quickly by the microcontroller module 6 turning off the associated relay to cut off DC power to the load type. This protects the internal relays from chatter as well as the negative effects of low voltage on the loads such as pumps.

In effect, the multichannel active sensing and switching device 2 according to the present invention has the ability to shut off one or more different load types due to very high current as well as low voltage.

Figure 3E:
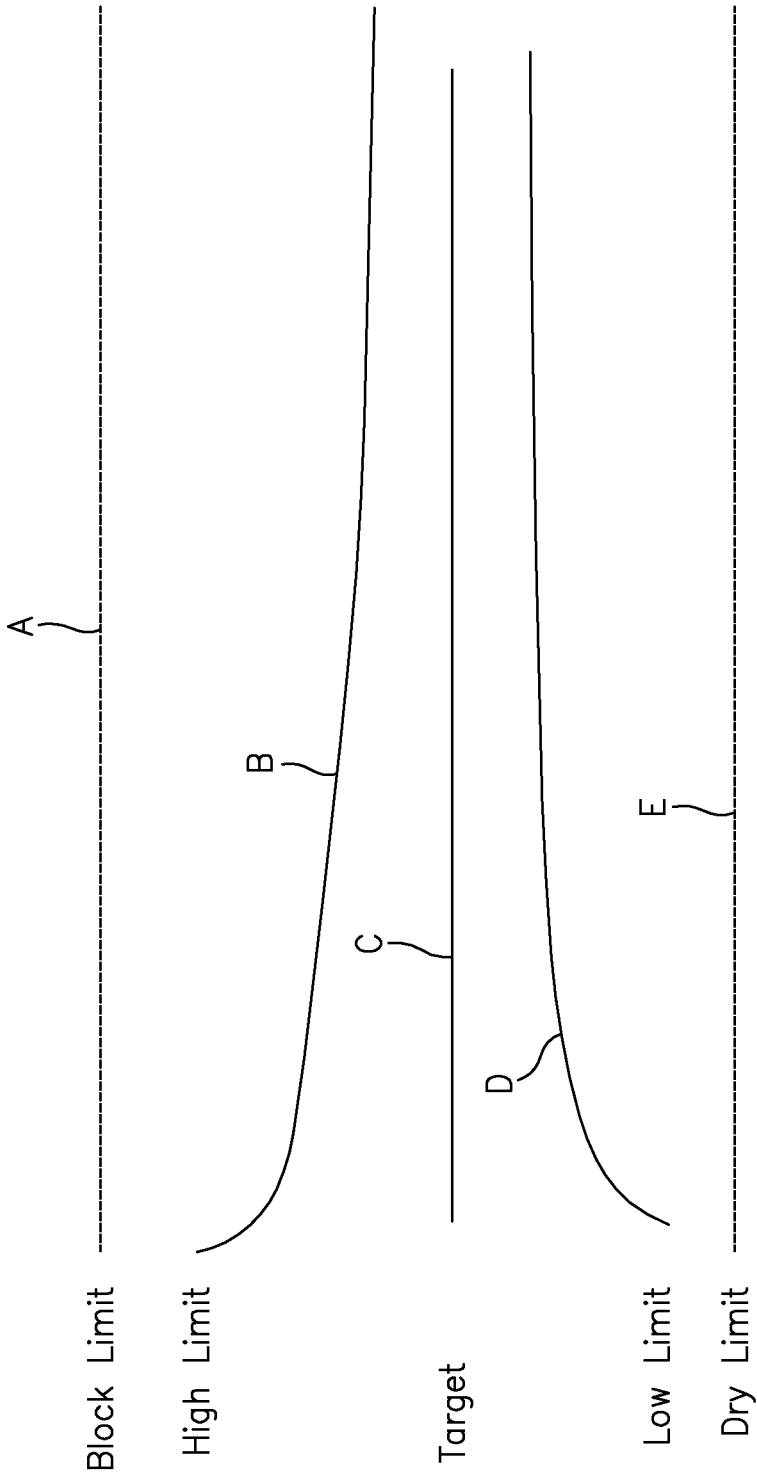
FIG. 3e is a graph of baseline parameter acquisition.

FIG. 3e shows a graph of baseline parameter acquisition. The multichannel active sensing and switching device 2 according to the present invention also has the ability to acquire the average current drain over long periods of time and use this as baseline to learn the average current target so as to modify the original factory setting for more specific control. At startup, the AI device 2 uses may use a very wide high and low current limits, but rapidly adjusts them via averaging during the initial minutes of normal operation to acquire a desired block current limit indicated by function A, a desired high current limit indicated by function B, a desired target current limit indicated by function C, a desired low current limit indicated by function D, and a desired dry current limit indicated by function E. Any changes in the baseline target current ranges may result in predetermined stored protective actions to be taken. The multiple sensing and switching module may also be configured to monitor incoming voltage to protect against low/high voltage spikes and adjust its internal parameters with fluctuations in battery voltage to maintain accuracy. Moreover, data acquisition may be based on total time, incidents occurring, voltage irregularities, and can be programmed and tailored to specific customer needs and applications. The networkability provides for remote interactive controls, including pump reversal and automatic shutoff.

The multichannel active sensing and switching device according to the present invention also has the ability to further adjust this learned value to variations in applied voltage to again more accurately tracks the changes in current that are due to system variations in voltage. This allows the current target to track the optimum target more accurately as the voltage changes with time or environmental reasons.

The control switches 32a, 32b, 32c allow an operator to manually turn of one or more of the different load types $L_{1,2}$, $L_{3,4}$, $L_{5,6}$ for an additional measure of control.

The multiple sensing and switching module may be configured to provide branch circuit protection that is user resettable and customizable with respect to the needs of user specific amp and voltage values.

The Controller Module

By way of example, the functionality of the controller module 6 may be implemented using hardware, software, firmware, or a combination thereof. In a typical software implementation, the controller module 6 would include one or more microprocessor-based architectures having a microprocessor, a random access memory (RAM), a read only memory (ROM), input/output devices and control, data and address buses connecting the same. A person skilled in the art would be able to program such a microprocessor-based implementation to perform the functionality described herein without undue experimentation. The scope of the invention is not intended to be limited to any particular implementation using technology known or later developed in the future.

FIG. 4

AI3 Circuit Description

FIG. 4 shows, by way of example, a schematic of a circuit for implementing the AI device 2 according to the present invention.

As shown, power is applied to two battery terminals, +voltage to the RED wire and −voltage to the BLACK wire. The power drives 6 loads (i.e. pumps) coupled to a connector J2 and runs directly to one side of each of 6 single pole double throw (SPDT) relays RY1, RY2, . . . , RY6 (see also relays 24, 26, 28 in FIG. 2) and also to the input circuit via resistor R1. The resistor R1 may be a low value resistor that acts a system fuse if excess current demand, while diode D1 prevents damage to the low voltage electronic circuitry for reverse voltage hookups. Optional IC U3 is shown as a fixed 12V voltage regulator, which is used in 24 VDC, input applications to down regulate the voltage to the +12 VDC applications. Low dropout regulator (LDO) device U3 is a high voltage input LDO with very low quiescent current (a few micro-amps) when the loads are OFF (TPS75150). It regulates the raw battery input voltage down to +5 VDC for proper operation of the microcontroller logic circuits. Transient voltage suppressor diode D2 is used to bypass incoming transients coming in the control via the spikes normally associated with a vehicle that couple on to the battery power distribution.

Microcontroller IC U1 is the heart of the system and is 8-bit CMOS flash EEPROM based device. Electromechanical SPDT switches are connected to the system via connector J3. Normally, the center of the switch is connected to the battery voltage via the resistors labeled R37, R38 and R39. In the fill position (see FIG. 6), the battery voltage is applied to across the input resistor R24-R29. Capacitors C12-17 are used to suppress input noise and spikes. Resistors R30-35 protect the microcontroller input from high noise spikes and current.

The switches control high current, reversible polarity outputs via a pair of relays, e.g. channel one is form by relays RY1 and RY2; channel two is formed by relays RY3, 4, and channel three is formed by relays RY5, 6. The relay coils are controlled via relay drivers U4 and U5 which buffer the low current/low voltage output signals from the microcontroller up the higher voltage/higher current levels required by the relay coils. The microcontroller U1 turns RY1 ON to make connector J2 pin 1 Positive (+Bat) with respect to J2 pin 2 which is OFF=Battery Ground. This would cause a DC to turn ON, and if the load were a pump with a reversible direction, it would turn say in the Clockwise direction. If the microcontroller energizes relay coil RY2, then J2 Pin 2 would be at battery potential while J2 Pin is at ground potential. If the load was a pump with a reversible direction, it would turn say in the counterclockwise direction. In contrast, if the load were resistive, such as a lamp, it would light up in either polarity.

The current flowing through the three channels of loads is sensed by resistors R3, R4, and R5 typical an extremely low value (0.005 ohms) and higher wattage (3 W). These sense resistors develop a signal of about 5 milli-volts per amp of current. These signals are amplified by a factor of 10 by op amps U6A, U6B, and U7A to a level of 50 mv/amp. The outputs of the amplifiers are applied to low pass filter composed of resistor/capacitor combinations R9/C5, R13/C6, and R17/C6 and then to the inputs of the microcontroller U1. These inputs are internally connected via software to an Analog to Digital Converter to convert them to digital values used by the program to determine the level of current in each channel.

The output of these op amps is also connected to comparators formed by U8A, U8B, and U8C. These comparators have outputs are which are normally active low. If current in an individual channel is very high, in the vicinity of 40 amps or more, the output of the respective comparator goes logic HIGH. The outputs of the individual comparators are wired-or'ed by combining their signals through diodes D9, 10,11, and D12. This signal is U4 section 1 and applied to the External Interrupt pin 33 of the microcontroller. This signal, in conjunction with internal software, will interrupt the normal program operation to give very quick response to a high current condition on one of channels. This allows the microcontroller to very quickly service the problem of an extremely high instantaneous current demand on a given channel. This is very useful when implementing the branch circuit "circuit breaker" function.

In addition to current, a fourth comparator U8D monitors the battery voltage. If it drops very low compared with the 12 V nominal, it will also generate an interrupt signal at pin 33 of the microcontroller. This can be significant in the case of an extremely low resistance short across the output channel power bus. This prevents the relays from chattering when the input voltage falls below the minimum "hold" voltage of the relays.

The microcontroller communicates with the rest of the system via serial data at 10.3 Kilo bps via a Local Interconnect Network ("LIN" bus) formed by the microcontroller serial data port and LIN transceiver IC U9. The LIN bus is a very low cost, 1 pin "slow" bus that communicates using SAE J2602 protocol. It gives the ability to interrogate and modify the current and time parameters of the loads controlled by AI as well as monitor those loads and report to displays, laptop PC's, and other networked controllers.

The scope of the invention is not intended to be limited to the specific details of the circuit shown in FIG. 4. As a person skilled in the art would appreciate, the present invention may be implemented using other types or kind of circuits either now known or later developed in the future.

FIG. 5

Normal Operation

FIG. 5 shows a flowchart generally indicated as 100 having steps 102, 104, . . . , 146, 148 of a normal operation routine according to the present invention, which is briefly described as follows:

Steps 102-110: The switch may include on, off and reverse positions.

Step 112: The pump switch is turned to the on position.

Steps 114-118: The first thing AI does is check battery voltage. If the battery voltage is below 9.5 VDC the switch will blink 4 times, signaling that the battery is too low to run the FIP pump. If the battery voltage is good the pump is turned on.

Steps 120-132: The AI then checks the pump for prime, if the pump doesn't prime then the AI shuts the unit off in a predetermined time period, e.g., 12 seconds, and blink the corresponding code, if the pump primes the AI checks for line block age, if there is line blockage (High Amperage) then the unit will shut off blinking the corresponding code, if there is no blockage the unit then checks for open current, if there is an open in the motor then the unit shuts off blinking the corresponding code, if not then the unit runs normally.

Steps 134-136: If during the operation the tank runs dry then the unit will, in seven seconds, shut off blinking 1 blink to signify run dry.

Steps 138-140: If the unit becomes clogged then the will, instantaneously, shut off blinking 2 blinks to signify high current draw.

Steps 142-144: If the unit experiences an open condition, winding breaks, power removed between AI and pump, the unit will within 20 seconds, shut off blinking 3 times to signify the open condition.

Steps 146-148: The pump is turned off automatically by the timer or manually by an operator.

Alternatively, if power to unit is below 9.5 VDC the unit will not turn pump on, as there is not sufficient power to run pump. The switch will blink 4 blinks. Unit will not power pump until power is restored to appropriate level.

FIG. 6

Fill-Drain Time Set Up Routine

FIG. 6 shows a flowchart generally indicated as 200 having steps 202, 204, . . . , 220, 222 of a fill-drain time set up routine according to the present invention, which is briefly described as follows:

In operation, the ASSD may be used to fill a container with a fluid via a pump. Before beginning, it is also important to note that:

One has to know the correct tank size and also know what the pump fills at, e.g., approximately 9 gallons/minute.

With power between the Pump and the Active Intelligence box disconnected, push toggle to the fill position and toggle between fill and drain 5 times stopping in the off position each time. Unit will blink showing what the current fill time is. 1 blink—2 minutes each additional blink is 30 seconds of fill time To increase fill time—toggle between off and the fill position, each toggle increases the fill time by 30 seconds.

To decrease fill time—toggle between off and drain position, each toggle decreases by 30 seconds.

Increments are 30 seconds (approximate 3.5 gallons per toggle) with minimum fill time of 2 minutes and maximum of 6 minutes.

Module will store run times in memory and only empty the same amount if filled each time.

Reconnect power to pump and cycle power.

Steps 204, 208, 210, 212 control the filling of the container with the fluid until the fill time is greater than or equal to a maximum preset value, while steps 206, 216 and 218 control the checking for a run dry condition of the pump.

FIG. 7

The ASSD as a Circuit Breaker

FIG. 7 shows the present invention in the form of a new and unique circuit breaker device generally indicated as 300, featuring a sensing and switching module 302 in combination with a controller module 304. In operation, the sensing and switching module 302 is configured to respond to an undesirable operational condition of a load type and provide a load type sensor signal along signal path 303 containing information about the undesirable operational condition of the load type, and also configured to respond to a controller signal along signal path 303 for shutting off the operation of the load type; and the controller module 304 is configured to respond to the load type sensor signal and provide the controller signal in order to shut off the operation of the load type.

Consistent with that set forth above, the sensing and switching module may take the form of a relay device, such as 24, 26, 28 in FIG. 2; the load type may take the form of a pump (see FIG. 1c); the undesirable condition may be a high current condition; and/or the controller module 304 may be programmable to sense one or more different undesirable circuit breaker conditions. By way of example, the functionality of the controller module 304 may be implemented similar to controller module 6 shown ad described above using hardware, software, firmware, or a combination thereof.

In effect, the multi-channel ASSD 2 has the ability to provide a new form of circuit breaker protection for certain applications without the need for expensive MOSFET devices and separate in-line fuses, which provides an important contribution to the state of the art. For example, since relays 24, 26, 28 can take high current loads, especially for a short period of time, the controller module 6 or 304 has the time to sample and sense such high current loads and shut off the relays and corresponding loads off before any serious damage is caused. As a person skilled in the art would appreciate, the cost of relays that can handle such high current, e.g. 30 Amps, is typically less than $1.00 at the time of filing the present invention, which is significantly less expensive than using the aforementioned MOSFET device using the prior art technique. In addition, In practice when the circuit breaker protection is tripped, e.g. by such a high current load, the ASSD may be reset to resume operation, which may not result in a service cost and/or charge to the owner of the boat or other suitable application. In view of this, the ASSD device according to the present invention satisfies a real need in the art by providing improved circuit breaker protection. This circuit breaker technique according to the present invention has recently received certification by a government testing agency for use in some applications, thus eliminating the need for in-line fuses.

Possible Applications

Possible applications include at least the following: Marine and leisure products (including components like pumps, motors, circuits, lights, appliances, other loads that need monitoring, computers, etc.), components in areas like recreational vehicles (RV), automotive, beverage, bar/restaurant, housing, manufacturing, medical facilities, military, industrial and/or aerospace, as well as the system integration of such components. The scope of the invention is not intended to be limited to any particular application or implementation either now known or later developed in the future.

The Scope of the Invention

It should be understood that, unless stated otherwise herein, any of the features, characteristics, alternatives or modifications described regarding a particular embodiment

What we claim is:

1. A multichannel active sensing and switching device comprising:
    a multiple sensing and switching module configured to respond to operational conditions of load types, each load type having a respective load type protection scheme, at least two of the load types having different respective load type protection schemes, and provide load type sensor signals containing information about the operational conditions of the load types, and also configured to respond to controller signals for controlling the operation of each load type in the respective load type protection scheme; and
    a controller module configured to respond to the load type sensor signals and provide the controller signals in order to control the operation of said each load type in the respective load type protection scheme in real time so that events are handled as real time tasks immediately and concurrently.

2. A multichannel active sensing and switching device according to claim 1, wherein the controller module is programmable and configured to provide a default circuit breaker configuration and a device specific configuration using active intelligence (AI).

3. A multichannel active sensing and switching device according to claim 1, wherein the controller module is configured to sense an over-current condition, such as a dead short, in at least one load type and provide a circuit breaker configuration control signal to shut off the at least one load type.

4. A multichannel active sensing and switching device according to claim 1, wherein the controller module is configured to determine a particular operational condition of at least one load type and provide a load protection diagnostics signal to shut off the at least one load type depending on the particular operational condition.

5. A multichannel active sensing and switching device according to claim 4, wherein the controller module is configured to determine a particular operational condition of a pump, including pump-specific operational conditions like run-dry, a blockage or low battery voltage, and provide a load protection diagnostics signal so as to implement run-dry protection, blockage, lo-battery voltage protection.

6. A multichannel active sensing and switching device according to claim 1, wherein the controller module is configured to use different algorithms to control the operation of the load types.

7. A multichannel active sensing and switching device according to claim 6, wherein the controller module comprises a memory module configured to store the different algorithms.

8. A multichannel active sensing and switching device according to claim 7, wherein the memory module includes a non-volatile (EEPROM) memory having the different algorithms stored as configuration data when the multichannel active sensing and switching device is programmed.

9. A multichannel active sensing and switching device according to claim 1, wherein the controller module is configured to provide a default control configuration for controlling the operation of at least one load type.

10. A multichannel active sensing and switching device according to claim 9, wherein the default control configuration includes a circuit breaker operation in which only an over-current condition will cause the multichannel active sensing and switching device to shut off the at least one load type and blink a diagnostic indication.

11. A multichannel active sensing and switching device according to claim 1, wherein the controller module is configured to respond to an input signal and enable an active intelligence mode so as to implement load-specific diagnostics.

12. A multichannel active sensing and switching device according to claim 1, wherein the controller module is configured to integrate current as a function of time and determine how much energy or power is being used instantaneously by at least one different load type so as to provide inrush current protection.

13. A multichannel active sensing and switching device according to claim 12, wherein the controller module is configured to implement a time/current magnitude weighted algorithm having a time loop subroutine in which the current and/or voltage is sampled at predetermined time intervals for a predetermined completion period.

14. A multichannel active sensing and switching device according to claim 13, wherein the time loop subroutine includes steps for sensing current of the at least one different load type, weighting a countdown variable based on the sensed current so as to determined a weighted countdown variable, and counting up or down to or from the predetermined completion period based on the weighted countdown variable.

15. A multichannel active sensing and switching device according to claim 14, wherein the controller module is configured to shut off the at least one different load type depending on the number of times the time loop subroutine is executed.

16. A multichannel active sensing and switching device according to claim 1, wherein the controller module is configured to be field programmable.

17. A multichannel active sensing and switching device according to claim 1, wherein the controller module is configured to respond to a signal containing information about a negative operational condition in at least one load type and provide a warning signal for controlling the provisioning of an audio warning, a visual warning or a combination thereof to indicate the negative operational condition of at least one load type.

18. A multichannel active sensing and switching device according to claim 1, wherein the controller module is configured to respond to a predetermined excessive voltage drop or current increase in at least one different load type and to shut off at least one load type when either condition is sensed.

19. A multichannel active sensing and switching device according to claim 1, wherein the controller module is configured to acquire an average current drain over long periods of time and use the average current drain as baseline to learn the average current target so as to modify an original factory setting for more specific control.

20. A multichannel active sensing and switching device according to claim 1, wherein the controller module is configured to adjust this learned value to variations in applied voltage to track changes in the current that are due to system variations in voltage so as to allow the current target to track the optimum target as the voltage changes with time or environmental reasons.

21. A multichannel active sensing and switching device according to claim 1, wherein the multiple sensing and switching module comprises sensors configured to respond to the operational condition of the load types and provide the load type sensor signals containing information about the operational conditions of the load types.

22. A multichannel active sensing and switching device according to claim 21, wherein the sensors are current sensors.

23. A multichannel active sensing and switching device according to claim 1, wherein the multiple sensing and switching module comprises relays configured to respond to the controller signal for controlling the operation of the load types.

24. A multichannel active sensing and switching device according to claim 1, wherein the power signals are DC signals from a DC power supply.

25. A multichannel active sensing and switching device according to claim 1, wherein the multichannel active sensing and switching device comprises multiple control switches configured to respond to input signals and provide control switch signals to the controller module for controlling the operation of the multiple sensing and switching module.

26. A method comprising:
sensing operational conditions of load types, each load type having a respective load type protection scheme, at least two of the load types having different respective load type protection schemes, and providing load type sensor signals containing information about the operational conditions of the load types;
responding to the load type sensor signals and providing controller signals in order to control the operation of each load type in the respective load type protection scheme; and
controlling the operation of each of the load types in the respective load type protection scheme in response to the controller signals in real time so that events are handled as real time tasks immediately and concurrently.

27. A method according to claim 26, wherein the method includes programming a controller module that is configured to provide a default circuit breaker configuration and a device specific configuration using active intelligence (AI).

28. A method according to claim 26, wherein the method comprises sensing an over-current condition, such as a dead short, in at least one load type and providing a circuit breaker configuration control signal to shut off the at least one load type.

29. A method according to claim 26, wherein the method includes determining a particular operational condition of at least one load type and providing a load protection diagnostics signal to shut off the at least one different load type depending on the particular operational condition.

30. A method according to claim 29, wherein the method includes determining a particular operational condition of a pump, including pump-specific operational conditions like run-dry, a blockage or low battery voltage, and providing the load protection diagnostics module signal so as to implement run-dry protection, blockage, lo-battery voltage protection.

31. A method according to claim 27, wherein the method includes using different algorithms to control the operation of the load types.

32. A method according to claim 31, wherein the method includes storing in a memory module the different algorithms.

33. A method according to claim 32, wherein the memory module includes a non-volatile (EEPROM) memory having the different algorithms stored as configuration data when the method is programmed.

34. A method according to claim 26, wherein the method includes using a default control configuration for controlling the operation of at least one load type.

35. A method according to claim 34, wherein the default control configuration includes a circuit breaker operation in which only an over-current condition will cause the method to shut off the at least one load type and blink a diagnostic indication.

36. A method according to claim 26, wherein the method includes responding to an input signal and enabling an active intelligence mode so as to implement load-specific diagnostics.

37. A method according to claim 26, wherein the method includes integrating current as a function of time and determining how much energy or power is being used instantaneously by at least one different load type so as to provide inrush current protection.

38. A method according to claim 37, wherein the method includes implementing a time/current magnitude weighted algorithm having a time loop subroutine in which the current and/or voltage is sampled at predetermined time intervals for a predetermined completion period.

39. A method according to claim 38, wherein the time loop subroutine includes steps for sensing current of the at least one different load type, weighting a countdown variable based on the sensed current so as to determined a weighted countdown variable, and counting up or down to or from the predetermined completion period based on the weighted countdown variable.

40. A method according to claim 39, wherein the method includes shutting off the at least one different load type depending on the number of times the time loop subroutine is executed.

41. A method according to claim 27, wherein the method includes programming the controller module in the field.

42. A method according to claim 26, wherein the method includes responding to a signal containing information about a negative operational condition in at least one load type and providing a warning signal for controlling the provisioning of an audio warning, a visual warning or a combination thereof to indicate the negative operational condition of at least one load type.

43. A method according to claim 26, wherein the method includes responding to a predetermined excessive voltage drop or current increase in at least one different load type and to shut off at least one load type when either condition is sensed.

44. A method according to claim 26, wherein the method includes acquiring an average current drain over long periods of time and use the average current drain as baseline to learn the average current target so as to modify an original factory setting for more specific control.

45. A method according to claim 26, wherein the method includes controller adjusting a learned value to variations in applied voltage to track changes in the current that are due to system variations in voltage so as to allow the current target to track the optimum target as the voltage changes with time or environmental reasons.

46. A method according to claim 26, wherein the method includes using sensors configured to respond to the operational conditions of the load types and provide the load type sensor signals containing information about the operational conditions of the load types.

47. A method according to claim 46, wherein the sensors are current sensors.

48. A method according to claim 26, wherein the method includes using relays configured to respond to the load type control signals for controlling the operation of the load types.

49. A method according to claim 35, wherein the power signal are DC signals from a DC power supply.

50. A method according to claim 26, wherein the method includes using multiple control switches configured to respond to input signals and provide control switch signals to a controller module for controlling the operation of a multiple active sensing and switching module.

51. Apparatus comprising:
- means for responding to operational conditions of load types, each load type having a respective load type protection scheme, at least two of the load types having different respective load type protection schemes, and providing load type sensor signals containing information about the operational conditions of each of the load types in the respective load type protection scheme, and also for responding to controller signals for controlling the operation of each load type in the respective load type protection scheme; and
- means for responding to the load type sensor signals and providing the controller signals in order to control the operation of each load type the respective load type protection scheme in real time so that events are handled as real time tasks immediately and concurrently.

52. Apparatus to claim 51, wherein the means for responding comprises a programmable controller module that is configured to provide a default circuit breaker configuration and a device specific configuration using active intelligence (AI).

53. A multichannel active sensing and switching device according to claim 1, wherein the controller module is configured to be networkable to one or more wired or wireless networks, including a local interconnect network (LIN), a controller area network (CAN), ZigBee, USB, Ethernet, or Wi-Fi.

* * * * *